United States Patent
Heuer et al.

(10) Patent No.: US 8,024,366 B2
(45) Date of Patent: Sep. 20, 2011

(54) SYSTEM AND METHOD FOR THE IMPROVED ENCODING/DECODING OF BINARY REPRESENTATIONS OF STRUCTURED, DOCUMENTS

(75) Inventors: Jörg Heuer, München (DE); Andreas Hutter, Müchen (DE); Ulrich Niedermeier, München (DE)

(73) Assignee: Siemens Aktiengesellschaft, Munich (DE)

( * ) Notice: Subject to any disclaimer, the term of this patent is extended or adjusted under 35 U.S.C. 154(b) by 1395 days.

(21) Appl. No.: 10/482,518

(22) PCT Filed: Jun. 25, 2002

(86) PCT No.: PCT/DE02/02309
§ 371 (c)(1),
(2), (4) Date: Dec. 29, 2003

(87) PCT Pub. No.: WO03/001811
PCT Pub. Date: Jan. 3, 2003

(65) Prior Publication Data
US 2004/0186841 A1    Sep. 23, 2004

(30) Foreign Application Priority Data
Jun. 25, 2001 (DE) ................... 101 30 525

(51) Int. Cl.
*G06F 7/00* (2006.01)
*G06F 17/30* (2006.01)
(52) U.S. Cl. ......................... 707/802; 707/791
(58) Field of Classification Search .................. 707/2–4, 707/103 R
See application file for complete search history.

(56) References Cited

U.S. PATENT DOCUMENTS

| | | | | |
|---|---|---|---|---|
| 5,321,750 A | * | 6/1994 | Nadan | 380/230 |
| 5,987,464 A | * | 11/1999 | Schneider | 707/10 |
| 6,442,549 B1 | * | 8/2002 | Schneider | 707/10 |
| 2002/0040475 A1 | * | 4/2002 | Yap et al. | 725/39 |
| 2002/0082998 A1 | * | 6/2002 | Sastri et al. | 705/51 |
| 2002/0138517 A1 | * | 9/2002 | Mory et al. | 707/513 |
| 2003/0172345 A1 | * | 9/2003 | Engelsberg et al. | 715/501.1 |

FOREIGN PATENT DOCUMENTS

| | | |
|---|---|---|
| WO | WO 97/34240 | 9/1997 |
| WO | WO 02/063775 | 8/2002 |

OTHER PUBLICATIONS

World Wide Web Consortium, "Namespaces in XML", Jan. 14, 1999, W3C, pp. 1-12.*
XP-001001465—"Text of ISO/IEC FCD 15938-1 Information Technology—Multimedia Content Description Interface—part 1 Systems" Mar. 2001 p. 55.

* cited by examiner

*Primary Examiner* — Sathyanarayan Pannala
(74) *Attorney, Agent, or Firm* — King & Spalding L.L.P.

(57) ABSTRACT

A schema definition, which is known to the encoder and to the decoder or transmitted from the encoder to the decoder, specifies information for calculating code concerning the elements or data types contained in the name subspace and enabling this information to be clearly assigned in this manner to each code in the name subspace. Only a portion of the entire name space including the number of the elements or data types lacking for the code calculation have to be transmitted for the configuration of a code which generally means a significantly smaller volume of data than the volume of data that would be required for the entire name space. In addition, the code tables are smaller than in entirely known name spaces which requires less storage space in the codec and enables a faster encoding and decoding.

18 Claims, 4 Drawing Sheets

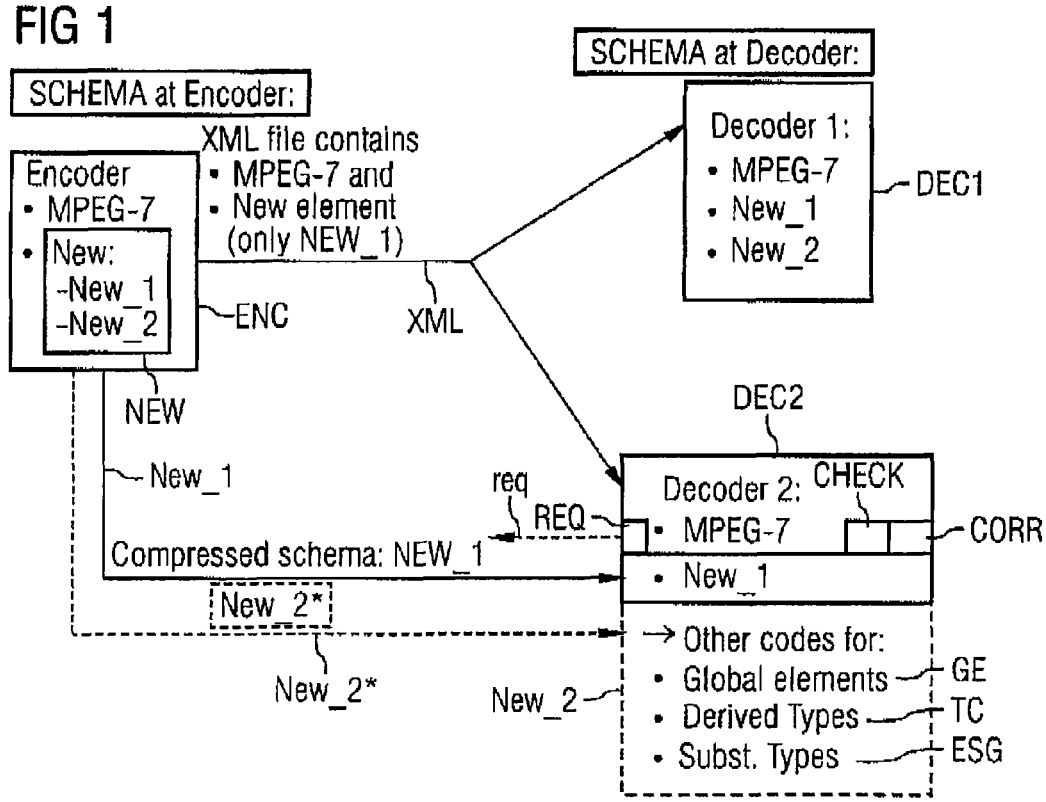
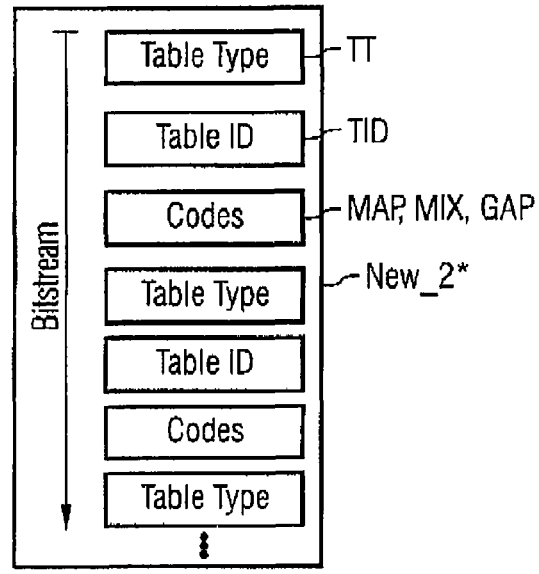

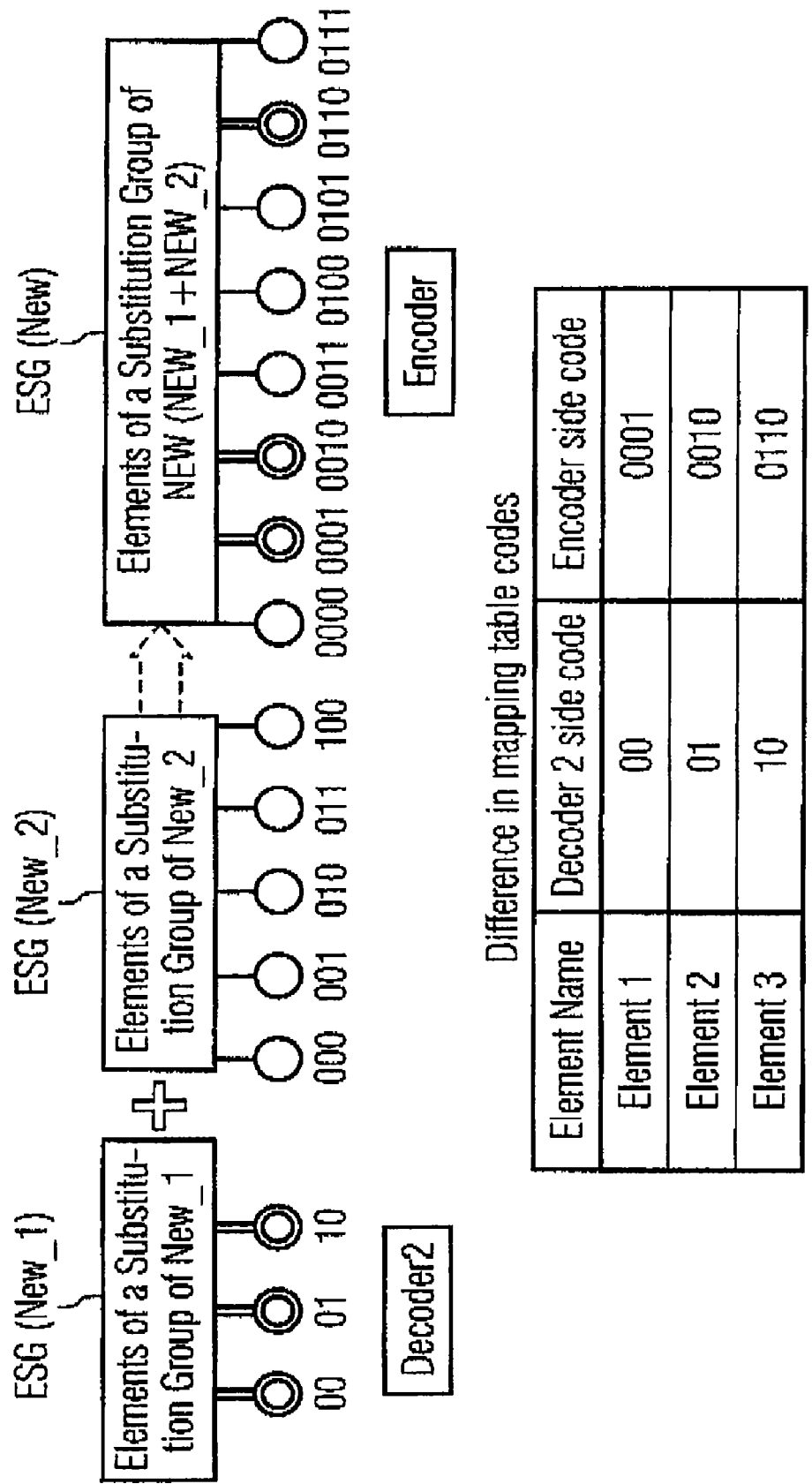

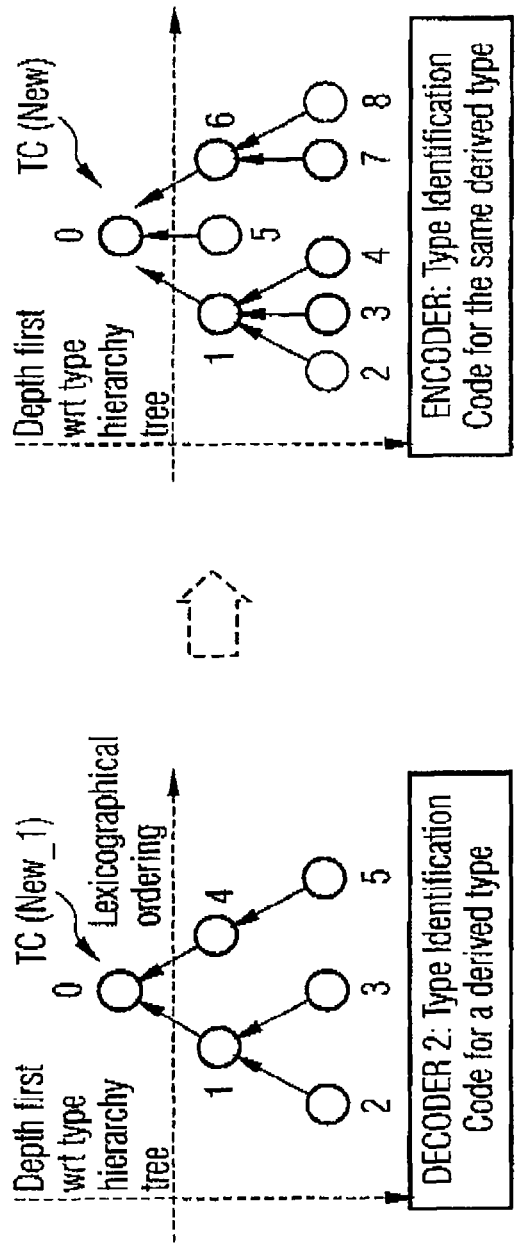

SYSTEM AND METHOD FOR THE IMPROVED ENCODING/DECODING OF BINARY REPRESENTATIONS OF STRUCTURED, DOCUMENTS

FIELD OF TECHNOLOGY

The present disclosure relates to methods, devices or systems in which a binary representation of a structured, in particular XML-based, document is encoded or decoded with the aid of a schema.

BACKGROUND

Methods, devices or systems of this type are known for example from publications relating to the MPEG-7 standard, in particular from the "Text of ISO/IEC FCD 15938-1 Information Technology—Multimedia Content Description Interface—Part 1, Systems" of the Systems Sub-Group, by Claude Seyrat (Expway), Michael Wollborn (Bosch), All Tabatabai (Sony, Olivier Avaro (France Telecom R&D) or ISO/IEC JTC1/SC29/WG11, MPEG 01/N4001, March 2001, Singapore".

These methods for binary representation of MPEG-7 and other XML-based descriptions or documents reveal deficiencies in terms of compatibility if only a part of the entire name space and/or a schema which was used for encoding is known to a decoder.

This object is achieved in respect of a better method for decoding, a better method for encoding, a system for improved encoding/decoding, a device for improved decoding, and a device for improved encoding by the features of the independent claims. The further claims relate to advantageous embodiments of the methods and of the system.

SUMMARY

Under an exemplary embodiment, information for the code calculation relating to the elements or data types not contained in the name subspace is included in the schema definition which is known to the encoder and to the decoder or which is transmitted from the encoder to the decoder, and in this way the information can be uniquely assigned to each code in a part of the entire name space designated in the following as a name subspace. As a result, only a portion of the entire name space including the number of the elements or data types missing for the code calculation have to be transmitted for the configuration of a codec, which generally means a significantly smaller volume of data than the volume of data that would be required for the entire name space. In addition, the code tables are smaller than in fully known name spaces, which requires less storage space in the codec and enables faster encoding and decoding.

BRIEF DESCRIPTION OF THE DRAWINGS

The various objects, advantages and novel features of the present disclosure will be more readily apprehended from the following Detailed Description when read in conjunction with the enclosed drawings, in which:

FIG. 1 shows a schematic of a system according to the invention with encoder and decoder, FIG. 2 shows a bit stream of a correction code from FIG. 1, FIG. 4 shows a diagram to explain the correction in the case of elements of a substitution group, and FIG. 5 shows a diagram to explain the correction in the case of type identification codes.

DETAILED DESCRIPTION

Figure 3:
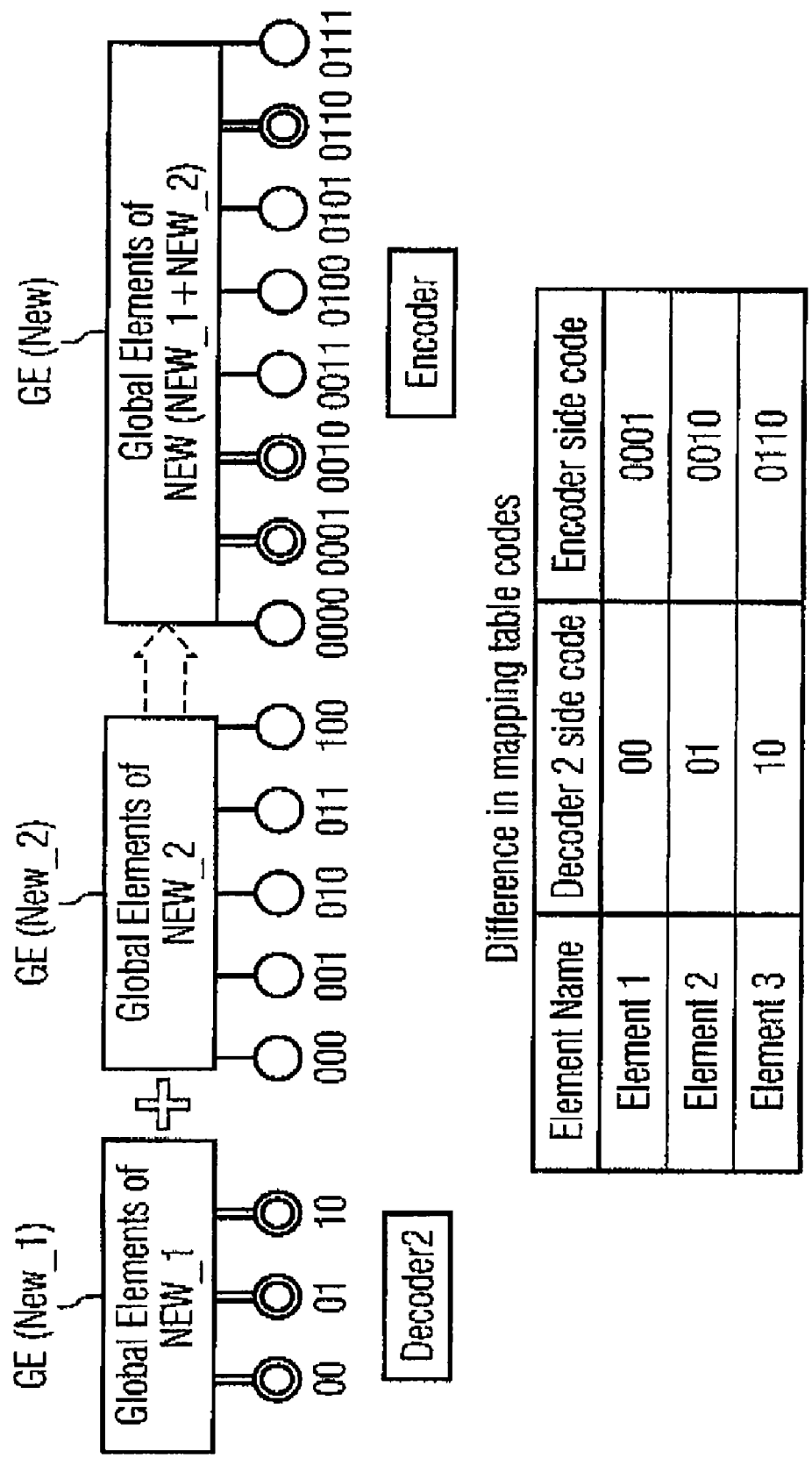
FIG. 3 shows a diagram to explain the correction in the case of global elements.

FIG. 1 shows as an example a system with an encoder ENC and two decoders DEC1 and DEC2, wherein a schema MPEG-7 and a schema New with the name subspaces NEW_1 and New_2 are available to the decoder. In this case the encoder sends an XML file XML containing MPEG-7 elements and elements of the schema New, but with the latter elements only originating from the name subspace NEW_1. The decoder DEC1, to which both name spaces MPEG-7 and New or the name subspaces New_1 and New_2 are known, can of course decode this document in a corresponding manner. On the other hand, only the name space MPEG-7 is known to the decoder DEC2. Therefore the name subspace New_1 is transmitted to this decoder DEC2 as a schema, for example in response to a request signal req or for example through regular transmission. However, the decoder DEC2 can now still not decode the document, since it lacks the code assignment of global elements GE, type codes TC and substitution codes ESG from the subspace New_2 and so it cannot calculate the code assignments. In order to eliminate this problem, instead of the entire name subspace New_2 being made available to the decoder DEC2, advantageously only a correction code New_2* is transmitted in place of the elements and/or types of the full name space which are not contained in the name subspace and/or simplified schema New_1. From the transmitted simplified schema, the decoder DEC2 can now decode the XML-based document XML with the aid of the correction code in accordance with the full name space and/or schema.

The encoder ENC and decoders DEC1 and DEC2 may be embodied as computer instructions stored in computer-readable storage media, such as RAM, ROM, one or more hard drives, or any other type of computer-readable storage media known to one of ordinary skill in the art. Such computer instructions are executable by one or more processors to provide the encoding/decoding functions discussed herein.

FIG. 2 shows a bit stream for the correction code New_2* which has at least a triple from a table type TT of the elements GE, ESG or types TC to be corrected, a table identification TID for specifying the table to be corrected and correction information MAP, GAP or MIX. From the code table of the simplified schema New_1 specified by the table type and the table identification, a code table of the full schema New is now generated with the aid of the correction information New_2 said code table containing only entries for the elements and types from the name subspace and/or simplified schema New_1.

The table type TT specifies whether a global element GE, type code TC or elements of a substitution group ESG is supplemented. The table identification TID identifies the table to be manipulated, this being effected in the case of the type code by means of the type code of the basic type referred to the original type and in the case of a substitution group by means of the schema branch code SBC of the global header element. In the case of global elements, however, the field TID is not encoded.

In FIG. 3, by way of example, the coding of the global elements GE(New_1) in the decoder DEC2 and the coding of the global elements GE(New) in the encoder ENC, in other words in the full name space, are compared with each other and the differences in the table codes established. From this it is clear that the codes of the elements 1 to 3 are designated by 00, 01 and 10 in the decoder DEC2 and, in contrast, by 0001, 0010 and 0110 in the encoder ENC, in other words that, for example, gaps 0000, gaps 0011 . . . 0101 and gaps 0111 can occur at the beginning, in the middle and at the end, respectively, of the code table.

FIG. 4 correspondingly shows the coding of elements ESG (New_1) of substitution groups in the decoder DEC2, in other words a decoding in the name subspace New_1, and a coding of the elements ESG(New) of this substitution group in the full name space New as well as the associated table codes. Here, too, it is clear that the codes 00, 01 and 10 of the elements 1 to 3 of the decoder DEC2 correspond to codes in the encoder which can be located at any position in the corresponding code table.

FIG. 5 shows this comparison between the type identification codes TC(New_1) in the decoder DEC2 and the type identification codes TC(New) for the same basic type in the encoder ENC, in other words in the full name space. The derived types in the name subspace to which type identification codes TC(New_1) are assigned can be arranged here, for example, in a tree-like structure, whereby the basic type is symbolized by means of a root node 0 having the child nodes 1 and 4 which represent types directly derived from the basic type, whereby the child node 1 in turn has child nodes 2 and 3 and the child node 4 has a child node 5, said child nodes representing types derived in turn from derived types. The five types 0 to 5 in the decoder DEC2 are represented in the encoder in a tree-like structure with nine nodes 0 to 8. The tree-like structure with the full name space has a root node 0 and three child nodes 1, 5 and 6, whereby the child node 1 in turn possesses three child nodes 2, 3 and 4 and the child node 6 in turn possesses two child nodes 7 and 8. Accordingly, the data types number 2, 5 and 8 are not known to the decoder DEC2 from the name subspace. As an unambiguous code assignment principle, the so-called "depth first" method can for example be used according to lexicographic order in compliance with the quoted MPEG-7 standard, said method therefore first addressing the possible nodes in depth or in the direction of leaves of a tree-like structure in order to map the tree-like structure of the derived types into a sequence of types and assign type codes to the types in this order of the sequence. Accordingly, the codes can also be represented in tabular form corresponding to the global elements and corresponding to a substitution group.

Finally, the last field MAP, MIX, GAP of a triple in the bit stream from FIG. 2 contains information about elements or types in a particular table or tree which have not been transmitted.

This information can be coded in accordance with three embodiments of the method according to the invention which are described in more detail below:

In the case of the method MAP, a correction code is transmitted for each code which is not calculated according to the encoder ENC by the decoder DEC2 due to the exclusive knowledge of the name subspace New_1; the correction code contains two parts, namely a length of the code words of the full name space and/or schema and a list containing code substitutions. In this case the decoder DEC2 replaces the codes contained in the addressed code table or in the code tree with the transmitted codes. This method is suitable in particular when the name subspace New_1 contains only a few element declarations or type definitions.

In the case of the method GAP, a correction code is transmitted which consists only of a list containing gap numbers for the code table of the full name space and/or schema. The decoder DEC2 reads in n+1 numbers, where n is the number of entries in the addressed code table or the code tree of the name subspace New_1. According to the read-in number, entries are generated at the relevant position in the code table or code tree. The codes of all the entries are then recalculated. This method is suitable in particular when the name subspace New_1 contains only a few element declarations or data type definitions.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

In the third case MIX, the correction information contains three parts, namely a length of the code words of the full name space and/or schema, a count of the number of gaps in the code table in relation to the full name space and/or schema, and a list containing code substitutions, whereby a code substitution for an element or a type is performed in each case directly after a gap in the code table and subsequently the code assignment of all the remaining entries in the code table is performed. The decoder DEC2 reads in the new code of the entry and modifies the codes of the following entries according to the known method cited in the introduction. This method is suitable in particular for many missing element declarations or type definitions which are related.

All three embodiments described above can be used as required for the correction information if the embodiment of the correction information used in the following is signaled before the actual correction information, for example using two bits.

The invention claimed is:

1. A method for improved decoding of a binary representation of a XML-based document, comprising the steps of:
    associating the binary representation of the XML-based document to a name space or schema, wherein the XML-based document contains only elements or types of a name subspace of the name space or of a simplified schema of the schema;
    transmitting the name subspace or simplified schema to at least one decoder;
    transmitting a correction code to the at least one decoder;
    performing a code substitution of the name subspace or simplified schema to codes of the name space or schema using the correction code; and
    decoding, via the decoder, the binary representation of the XML-based document in accordance with the name space or schema from the name subspace or simplified schema with the aid of the correction code;
    wherein the decoder is embodied in computer instructions stored in non-transitory computer-readable storage media and executable by the processor.

2. The method according to claim 1, wherein the at least one decoder forms a request signal for transmitting (1) the name subspace or simplified schema and (2) the correction code, if this name space or schema is not present in the at least one decoder.

3. The method according to claim 1, wherein the correction code consists of a bit stream containing at least one triple from:
    (a) a table type of the elements or types to be corrected,
    (b) a table identification for specifying the table to be corrected, whereby no coding takes place in the case of global elements, and
    (c) correction information.

4. The method according to claim 3, wherein a code table of the name space or schema for the elements and types of the name subspace or simplified schema is generated from a code table of the name subspace or simplified schema specified by the table type and table identification with the aid of the correction information.

5. The method according to claim 3, wherein the correction information contains a length of the code words of the name space or schema and a list containing code substitutions.

6. Method according to claim 3, wherein the correction information contains a list containing a count of the number of gaps for the code table of the name space or schema.

7. Method according to claim 3, wherein the correction information contains a length of the code words of the name space or schema, a count of the number of gaps in the code table in relation to the name space or schema and a list containing code substitutions, whereby a code substitution for an element or a type is performed in each case directly after a gap in the code table and subsequently the code assignment of all the remaining entries in the code table is performed.

8. A method for improved encoding of a XML-based document, comprising the steps of:
forming a binary representation of an XML-based document from the XML-based document with at least one name space or schema, wherein the XML-based document contains from the name space or schema only elements or types of a name subspace of the name space or of a simplified schema of the schema; and
forming (1) the name subspace or simplified schema and (2) a correction code, wherein, by aid of the correction code, a code substitution of the name subspace or simplified schema to codes of the name space or schema is executed;
wherein both forming steps are performed by computer instructions stored in non-transitory computer-readable storage media and executable by the processor.

9. The method according to claim 8, wherein, only in response to a request signal, an encoder forms a name subspace or schema containing (1) the elements or types of the document and (2) a correction code.

10. The method according to claim 9, wherein the correction code comprises a bit stream containing at least one triple from:
(a) a table type of the elements or types to be corrected,
(b) a table identification for specifying the table to be corrected, whereby no coding takes place in the case of global elements, and
(c) correction information.

11. The method according to claim 10, wherein a code table of the name space or schema for the elements and types of the name subspace or simplified schema is generated with the aid of the correction information from a code table of the name subspace or simplified schema specified by the table type and the table identification.

12. The method according to claim 10, wherein the correction information includes a length of the code words of the name space or schema and a list containing code substitutions.

13. The method according to claim 10, wherein the correction information contains a list containing a count of the number of gaps for the code table of the name apace or schema.

14. The method according to claim 10, wherein the correction information includes a length of the code words of the name space or schema, a count of the number of gaps in the code table in relation to the name space or schema and a list containing code substitutions, whereby a code substitution for an element or a type is performed in each case directly after a gap in the code table and subsequently the code assignment of all the remaining entries in the code table is performed.

15. A system for improved encoding/decoding of a XML-based document, comprising:
a processor;
an encoder that forms a binary representation of the XML-based document from the XML-based document with at least one name space or schema;
at least one decoder that receives the binary representation from said encoder, wherein the XML-based document contains from the name space or schema only elements or types of a name subspace of the name space or of a simplified schema of the schema, wherein the encoder forms and transmits a name subspace or simplified schema and a correction code to the at least one decoder, wherein, by the aid of the correction code, a code substitution of codes of the name subspace or simplified schema to codes of the name space or schema is executed, and
wherein the at least one decoder decodes the binary representation of the XML-based document in accordance with the name space or schema from the name subspace or simplified schema with the aid of the correction code;
wherein the encoder and the decoder are embodied in computer instructions stored in non-transitory computer-readable storage media and executable by the processor.

16. The system according to claim 15, wherein the at least one decoder checks for the presence of a required name space or schema in the relevant decoder and, if this name space or schema is not present in the at least one decoder, forms a request signal and transmits the request signal to the encoder (ENC),
wherein the encoder forms (1) the name subspace or the simplified schema and (2) the correction code, and transmits these to the at least one decoder.

17. A device for improved decoding of a binary representation of a XML-based document based on a name space or schema, wherein the XML-based document contains from the name space or schema only elements or types of (1) a name subspace of the name space or of (2) a simplified schema of the schema, said device comprising:
a processor;
a unit that receives (1) the name subspace or simplified schema and (2) a correction code, wherein the unit performs a substitution of the codes in the name subspace or simplified schema to codes of the name space or schema using the correction code; and
a further unit that decodes the binary representation of XML-based document in accordance with a name space or schema from the name subspace or simplified schema using the correction code;
wherein the unit and the further unit are embodied in computer instructions stored in non-transitory computer-readable storage media and executable by the processor.

18. A device for improved encoding of a binary representation of a XML-based document, comprising:
a processor;
a unit that forms a binary representation of the XML-based document containing at least one name space or schema, wherein the XML-based document contains from the name space or schema only elements or types of (1) a name subspace of the name space or of (2) a simplified schema of the schema, a further unit that transmits (1) the name subspace or simplified schema and (2) a correction code, wherein a code substitution of codes of the name subspace or simplified schema to codes of the name space or schema is executed with the aid of the correction code;

wherein the unit and the further unit are embodied in computer instructions stored in non-transitory computer-readable storage media and executable by the processor.

* * * * *